United States Patent [19]
Dean

[11] Patent Number: 5,837,110
[45] Date of Patent: Nov. 17, 1998

[54] SPHERICAL SECTION ELECTROCHEMICAL CELL STACK

[75] Inventor: W. Clark Dean, Simsbury, Conn.

[73] Assignee: United Technologies Corporation, Hartford, Conn.

[21] Appl. No.: 768,248

[22] Filed: Dec. 17, 1996

[51] Int. Cl.$^6$ .............................. C25B 9/00; C25B 15/08
[52] U.S. Cl. ......................... 204/240; 204/242; 204/256; 204/258; 204/266; 204/267; 204/275; 204/277; 204/278; 204/270
[58] Field of Search ..................................... 204/253–256, 204/257–258, 267–270, 263–266, 240, 242, 275–278

[56] References Cited

U.S. PATENT DOCUMENTS

| | | | |
|---|---|---|---|
| 1,799,116 | 3/1931 | Noeggerath . | |
| 4,698,143 | 10/1987 | Morris et al. | 204/253 |
| 4,728,585 | 3/1988 | Briggs | 204/270 |
| 5,292,405 | 3/1994 | Wicks | 204/269 X |
| 5,399,250 | 3/1995 | Moon et al. | 204/256 X |

*Primary Examiner*—Donald R. Valentine
*Attorney, Agent, or Firm*—Malcolm J. Chisholm, Jr.

[57] ABSTRACT

A spherical section electrochemical cell stack is disclosed for generating a product gas such as oxygen from a supply fluid such as water. In a preferred embodiment, the invention includes a spherical section top end plate; a spherical section bottom end plate; one or more spherical section electrochemical cells secured between the top and bottom end plates so that curvature dimensions of the top and bottom end plates and cell are in parallel alignment to thereby minimize any distances between the end plates and cell; and a spherical section pressure header secured to the bottom end plate so that curvature dimensions of the bottom end plate and pressure header are in opposed alignment to thereby define an integral high pressure chamber between the bottom end plate and pressure header. The integral high pressure chamber may be filled with a drying and/or filtering agent so that the product gas may pass through the chamber before leaving the cell. By combining the spherical section bottom end plate with the spherical section pressure header to define the high pressure chamber, a savings of more than half the weight and volume of prior art high pressure filtering-drying chambers is achieved. The spherical section electrochemical cell stack also includes by-pass pressure channels for safety, and integral valve cavity components.

20 Claims, 5 Drawing Sheets

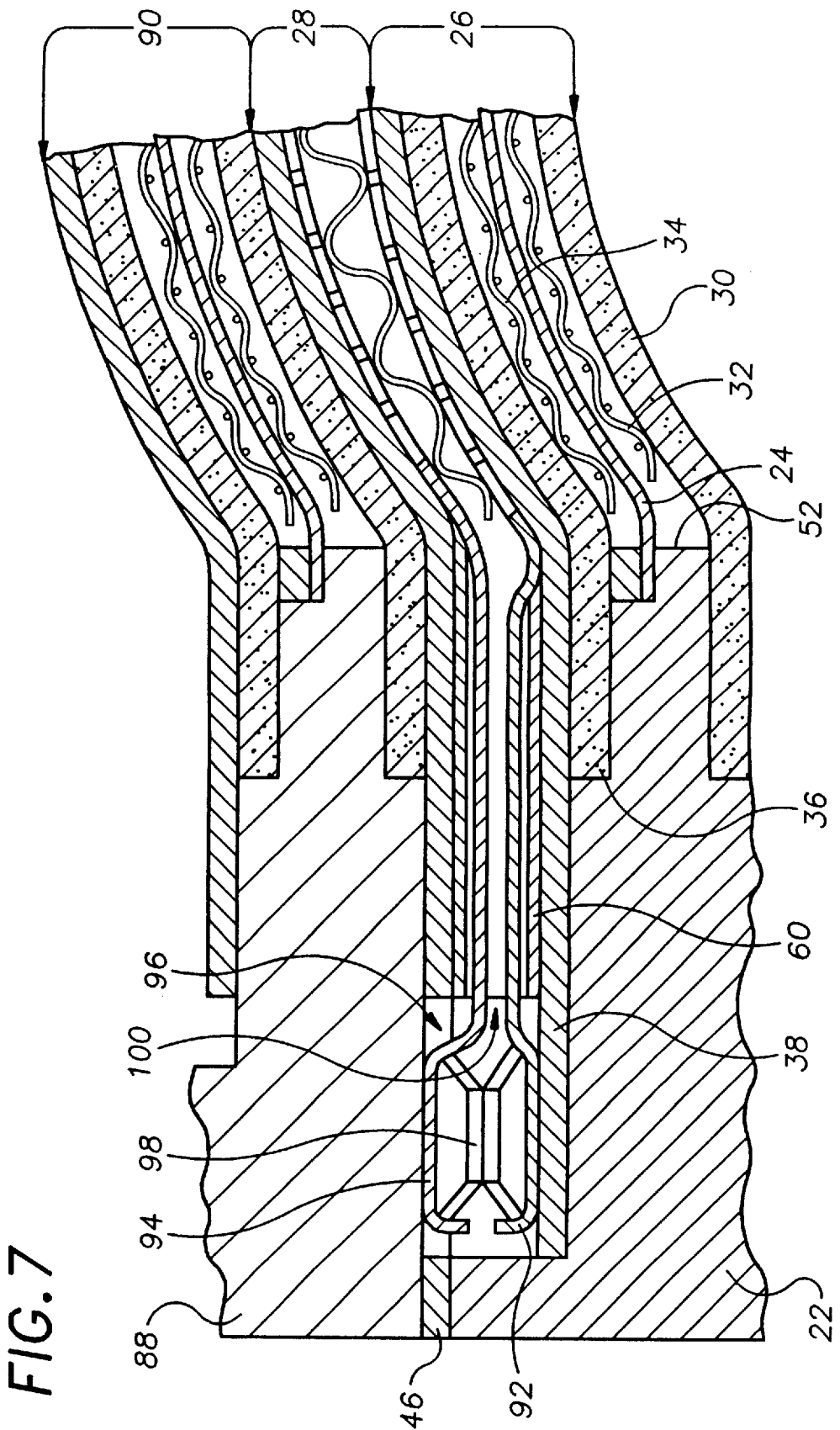

SPHERICAL SECTION ELECTROCHEMICAL CELL STACK

TECHNICAL FIELD

The present invention relates to electrochemical cell stacks for electrolyzing substances, and especially relates to high pressure electrochemical cell stacks for producing oxygen gas from water for use in air and space craft.

BACKGROUND OF THE INVENTION

Electrochemical cell stacks are commonly used for producing product gases from a supply fluid such as water, and may also be used in "fuel cell" configurations to produce electrical energy from gaseous supply fuels. Such electrochemical cell stacks typically include a plurality of disk-shaped electrochemical cells arranged in vertical stacks and surrounded by a frame that contains pressure generated by the cells during operation.

A common use of an electrochemical cell stack is to produce oxygen and hydrogen gas from water. The oxygen gas may be used for breathing, for example in a submarine or space craft, while the hydrogen may be used as a propellant in an engine. Storage efficiencies of gases generated by electrochemical cell stacks increase with increased internal operating pressures. As internal operating pressures increase, however, structural characteristics of the stack and of individual electrochemical cells must contain substantial pressure differentials without damage. In a traditional working environment of electrochemical cell stacks such as a submarine, internal pressure differentials have been contained by large, heavy frame components typically including thick, metal end plates at opposed ends of a cell stack, and a plurality of large bolts passing between the end plates and surrounding the cell stack. The bolts are adjusted to apply a pressure preload to the stack to compress gaskets and seals between and within individual cells.

A particular demand for use of electrochemical cell stacks has arisen in producing oxygen gas onboard modern, commercial aircraft. For example, in the event of an emergency, such as an unexpected cabin de-pressurization at a high altitude, oxygen masks automatically deploy to provide passengers with oxygen. The oxygen is typically stored onboard the air craft in metal bottles, and the bottles are routinely topped off while the aircraft is being serviced. An electrochemical cell stack onboard the aircraft can be used to top off the bottles thereby saving the time and cost expense of servicing on the ground, and such a cell stack can provide oxygen for other, diverse circumstances. Efficient generation of oxygen gas in such a working environment requires that the electrochemical stack be operated with an internal pressure differential within the stack and within individual cells of the stack of approximately 2,000 pounds per square inch (hereafter "P.S.I.").

Known electrochemical cell stacks having such an operating capacity however require large, heavy frame components. Ancillary high pressure components required by such cell stacks also add weight and take up additional space. For example an oxygen dryer and filter component is typically positioned down stream of the cell stack, and check valves, solenoid actuated valves, manual override valves, and pressure sensors are frequently secured up and down stream of the cells, adding even further weight and volume to properly operate the stack. Such weight and volume requirements severely limit applicability of electrochemical cell stacks in an oxygen generating system onboard a modern commercial aircraft or space craft.

Additionally some known electrochemical cell stacks utilize solid polymer electrolyte membranes as disclosed in U.S. Pat. No. 5,466,354 to Leonida et al., which patent is hereby incorporated herein by reference. Those cell stacks typically utilize a spring pre-load system such as a well-known multi-wave spring to apply a load to one or more adjacent flat plates and the plates apply the load to an adjacent flat polymer electrolyte membrane. Because of inherent non-uniformity in manufacture of components of the spring pre-load system, non-uniform loads are applied to the membranes. While such non-uniform loads will not interrupt or significantly effect a cell during low pressure operating conditions, when operated under high pressure conditions, the non-uniform pressure loads result in shifting of the membranes, and can even lead to tearing of the membranes and a potential for mixing of product gases. Consequently, known electrochemical cell stacks utilizing solid polymer electrolyte membranes are incapable of safely and efficiently operating at pressures required for storage of oxygen generated by an electrochemical stack onboard a modern commercial aircraft.

Accordingly, it is the general object of the present invention to overcome the size, weight, and safety problems of prior art electrochemical cell stacks.

It is a more specific object to provide an electrochemical cell stack capable of operating with internal pressures of approximately 2,000 P.S.I. without heavy, large frame components.

It is yet another specific object to provide an electrochemical cell stack that minimizes the weight and space requirements of components ancillary to operation of the cell stack.

It is a further object to provide an electrochemical cell stack that minimizes risks of shifting of a solid polymer electrolyte membrane in cells of the stacks exposed to internal pressures of approximately 2,000 P.S.I.

The above and other advantages of this invention will become more readily apparent when the following description is read in conjunction with the accompanying drawings.

SUMMARY OF THE INVENTION

A spherical section electrochemical cell stack is disclosed for generating a product gas such as oxygen from a supply fluid such as water. In a preferred embodiment, the invention includes: a spherical section top end plate; a spherical section bottom end plate; a spherical section electrochemical cell secured between the top and bottom end plates so that curvature dimensions of the top and bottom end plates and cell are in parallel alignment to thereby minimize any distances between the end plates and cell; and a spherical section pressure header secured to the bottom end plate so that curvature dimensions of the bottom end plate and pressure header are in opposed alignment to thereby define an integral high pressure chamber between the bottom end plate and pressure header. (The phrase "curvature dimension" means a cross-sectional orientation of a curved surface. For example, if two adjacent curved surfaces have identical curvature dimensions in "parallel alignment", that means their curves point in the same direction so the surfaces can "nest" together. If they have their curvature dimensions in "opposed alignment", that means their curves point in opposed directions, so a void is defined between their curved surfaces.)

The spherical section electrochemical cell includes an outer ring surrounding spherical section mechanical support components that direct pressure loads to the outer ring.

Additionally, the outer ring of the cell and the top and bottom end plates cooperate to contain internal operating pressure loads during operation of the cell stack. Consequently, the mechanical support components do not have to be as strong or large as mechanical support components of prior art flat electrochemical cells, thereby achieving weight, volume and cost savings.

The integral high pressure chamber may be filled with a drying and/or filtering agent so that the product gas may pass through the chamber before leaving the stack. By combining the spherical section bottom end plate with the spherical section pressure header to define the high pressure chamber, a savings of more than half the weight and volume of prior art high pressure filtering/drying chambers is achieved. The spherical section electrochemical cell stack also includes integral valve and duct components achieving even greater weight and volume savings, such as valves and ducts directing the product gases from the spherical section electrochemical cell to the integral high pressure chamber. Preferred embodiments of the spherical section electrochemical cell stack include a plurality of spherical section electrochemical cells.

BRIEF DESCRIPTION OF THE DRAWINGS

FIG. 7 is fragmentary cross-sectional view of the FIG. 1 spherical section electrochemical cell stack showing electrical conductivity components of the stack.

DESCRIPTION OF THE PREFERRED EMBODIMENTS

Figure 1:
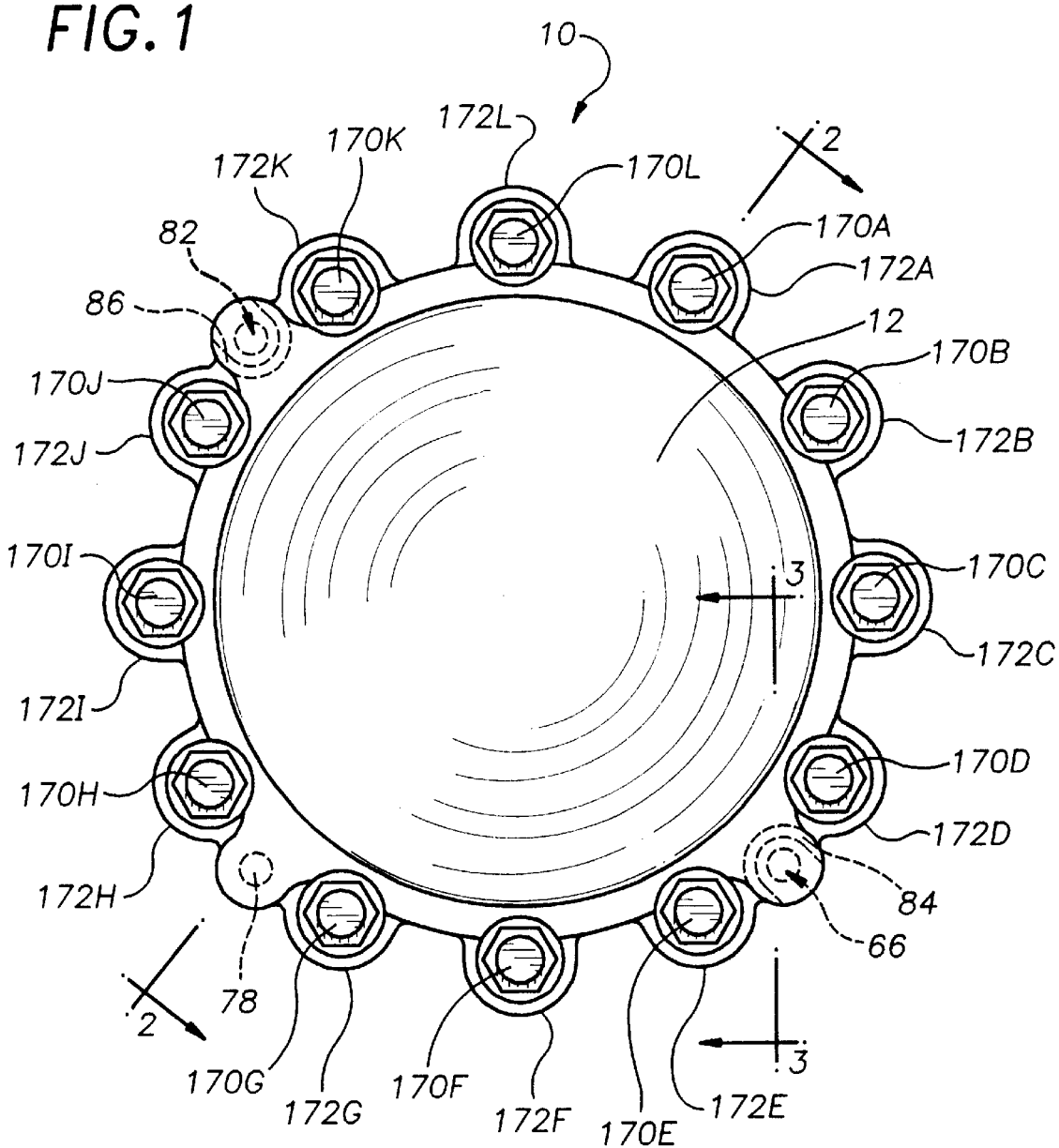
FIG. 1 is a top plan view of a spherical section electrochemical cell stack constructed in accordance with the present invention.
Figure 2:
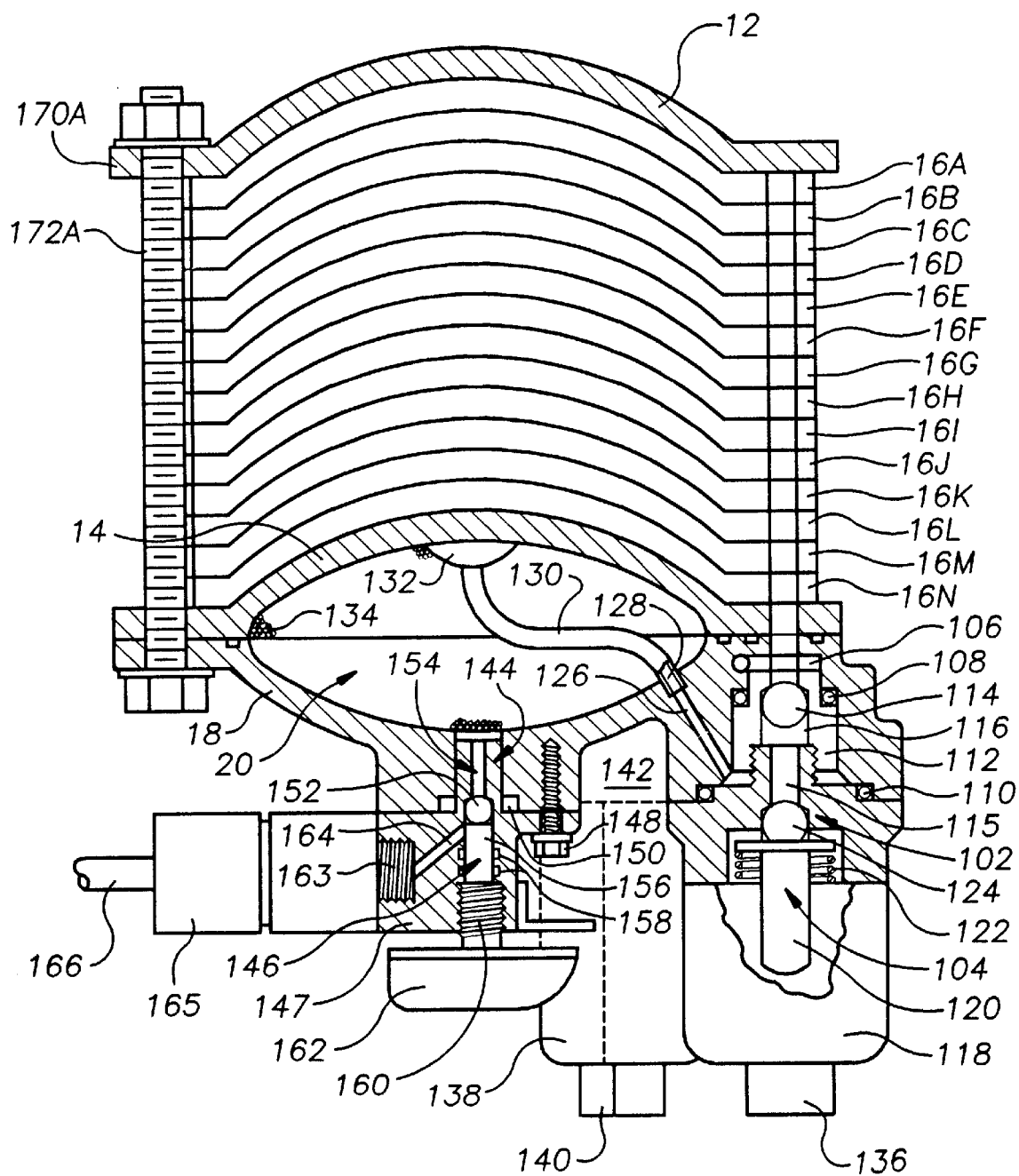
FIG. 2 is a cross-sectional view of the FIG. 1 spherical section electrochemical cell stack taken along view line 2—2 of FIG. 1.

Referring to the drawings in detail, a spherical section electrochemical cell stack of the present invention is shown and generally designated by the reference numeral 10. As best shown in FIGS. 1 and 2, the spherical section electrochemical cell stack 10 includes: a spherical section top end plate 12; a spherical section bottom end plate 14; a plurality of spherical section electrochemical cells 16A, 16B, 16C, 16D, 16E, 16F, 16G, 16H, 16I, 16J, 16K, 16L, 16M and 16N (shown schematically in FIG. 2 and hereafter referred to for convenience as "16A–16N") secured between the top and bottom end plates 12, 14 so that curvature dimensions of the top and bottom end plates 12 and the spherical section cells 16A–16N are in parallel alignment; and a spherical section pressure header 18 secured to the bottom end plate 14 so that curvature dimensions of the bottom end plate 14 and pressure header 18 are in opposed alignment to thereby define a high pressure chamber 20 between the bottom end plate 14 and pressure header 18. The phrase "spherical section" means that a curved surface defines a section of a surface of a sphere.

As best seen in FIG. 2, the phrase "curvature dimension" as used herein means a cross-sectional orientation of a curved surface. For example, spherical section top end plate 12 and spherical section electrochemical cell 16A both define virtually identical curved surfaces. When the identical curved surfaces of the top end plate and electrochemical cell 16A have their curved surfaces both pointing in the same direction (such as away from the bottom end plate 14), for purposes herein they are described as having their curvature dimensions in "parallel alignment". In contrast, when virtually identical curved surfaces of the bottom end plate 14 and the spherical section pressure header 18 have their curvature dimensions pointing in opposed directions, for purposes herein they are described as having their curvature dimensions in "opposed alignment" so that a void is thereby defined between the bottom end plate 14 and pressure header 18. The spherical section top end plate 12, bottom end plate 14 and electrochemical cells 16A–16H have virtually identical curvature dimensions.

Figure 3:
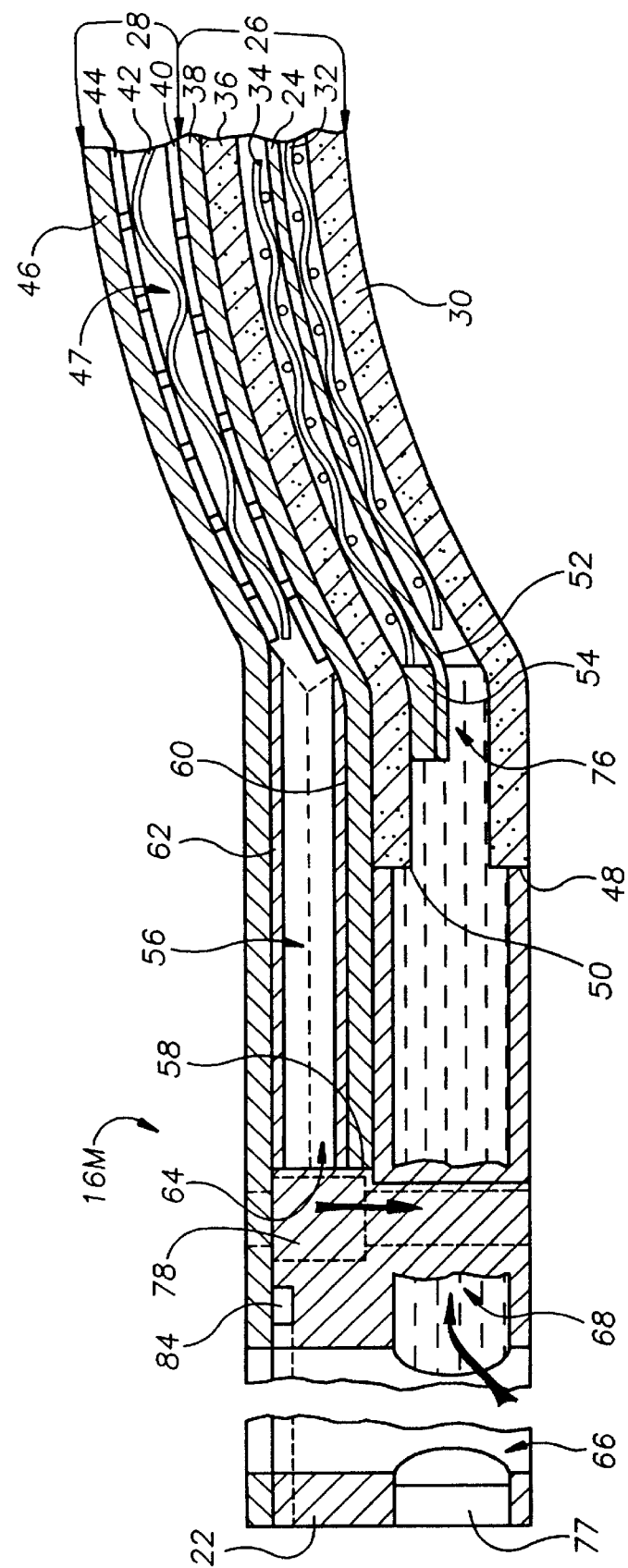
FIG. 3 is a fragmentary cross-sectional view of the FIG. 1 spherical section electrochemical cell stack taken along view line 3—3 of FIG. 1.
Figure 4:
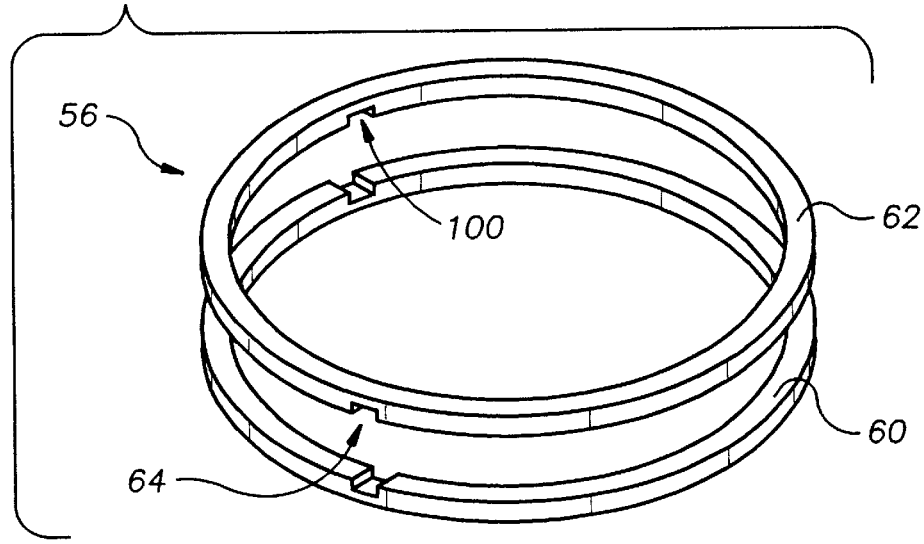
FIG. 4 is an exploded perspective view of a split pressure ring of the spherical section electrochemical cell stack.
Figure 5:
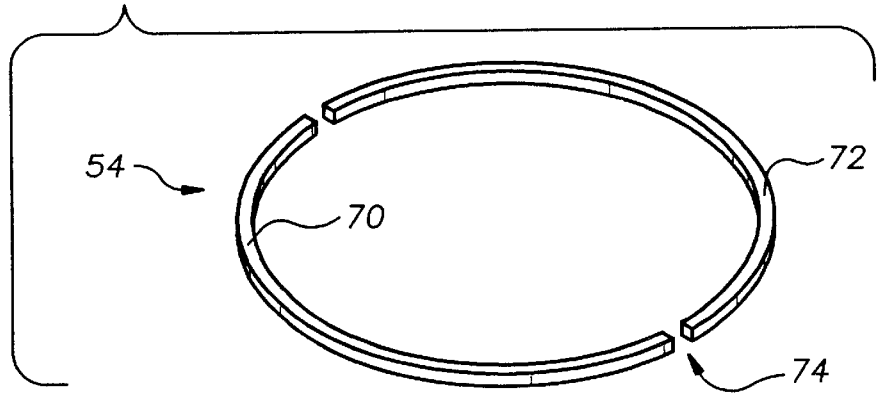
FIG. 5 is a perspective view of spacer ring halves of the spherical section electrochemical cell stack.

FIG. 3 shows a fragmentary cross-sectional view of one of the FIG. 2 spherical section electrochemical cells, such as cell 16M. Each such cell includes an outer ring 22 (also shown in FIG. 6) that surrounds a spherical section mechanical support means for supporting electrochemical component means of the cell and for directing forces acting on the cell to the outer ring. The spherical section mechanical support means may comprise a support dome 24 made of a strong, metallic compound that is compatible with the operating fluids of the cell, such as modern stainless steels.

Each spherical section electrochemical cell 16A–16N, such as electrochemical cell 16M also includes electrochemical component means for processing supply and product fluids such as for electrolyzing a supply of water into product gases such as oxygen and hydrogen gas. Such electrochemical cell component means (as best seen in FIG. 3 in reference to cell 16M) include a supply fluid side 26 and an adjacent product gas side 28. The supply fluid side 26 includes the following components stacked sequentially: a first porous metal plate 30; a first support screen 32 and a second support screen 34 on opposed sides of the support dome 24; a second porous metal plate 36; and a first solid polymer electrolyte membrane 38. The first and second porous metal plates 30, 36 are made of sintered metallic powder producing pore size openings of 5 microns to 50 microns. Such small openings prevent extrusion of the solid polymer electrolyte membrane 38 through the metal plates at an operating pressure of 2,000 P.S.I. Fine woven wire screen with a twill weave producing similar sized pore openings may also act as the first and second metal plates 30, 36. The first and second support screens 32, 34 each consist of a pair of expanded metal screens between 0.005 inches to 0.010 inches thick with diamond-shaped openings approximately 0.010 inches wide and 0.020 inches long. Halves of each pair are displaced laterally from each other to allow serpentine flow of fluids through the first and second support screens 32, 34. Square weave wire screen with wires approximately 0.010 inches in diameter spaced approximately 0.030 inches on center can also be used as the first and second support screens 32, 34. The first solid polymer electrolyte membrane 38 is of a type well-known in electrochemical cell art, as more thoroughly described in the aforesaid U.S. Pat. No. 5,466,354 to Leonida et al. previously incorporated herein. The product gas side 28 includes the following components stacked sequentially: a first expanded metal plate 40 adjacent the first solid polymer electrolyte membrane 38; a spring plate 42; a second expanded metal plate 44; and a second solid polymer electrolyte membrane 46. The membrane 46 is virtually identical to the first polymer electrolyte membrane 38. The first and second expanded metal plates 40, 44 are expanded metal screens from 0.005 to 0.010 inches thick with diamond-shaped openings approximately 0.010 inches wide and 0.020 inches long. These plates 40, 44 act to conduct electricity to a catalytic coating of the solid polymer electrolyte membranes 38, 46 in a manner well-known in the art while allowing a product gas to move through the openings and allowing a supply fluid to reach the catalytic coating of the membranes. The spring plate 42 may be in the form of a multi-wave spring made of a corrugated metallic material well-known in the art, so that the spring plate 42 asserts a pressure pre-load of approximately 200 pounds per square inch ("P.S.I.") on the adjacent surfaces when the spherical section electrochemical cell is assembled into the cell stack 10. As shown in FIG. 3, the spring plate contacts the first and second expanded metal plates 40, 44 at a plurality of points, but not in intimate surface-to-surface contact, so that a product gas chamber 47 is defined by the spring plate 42 between expanded metal plates 40, 44 which permits movement of a product gas.

As best seen in FIGS. 3–6, the first porous metal plate 30 is dimensioned to abut a first plate shoulder 48 of the outer ring 22, and the second porous metal plate 36 is dimensioned to abut a second plate shoulder 50 of the outer ring 22. The support dome 24 is dimensioned to sit on a support shoulder 52 of the outer ring 22, and a support ring 54 (seen in FIGS. 3 and 5) rests on the support dome 24 under the second porous metal plate 36 adjacent the support shoulder 52 to mechanically secure the support dome 24 adjacent the outer ring 22. A split spacer 56 (shown in FIGS. 3 and 4) is dimensioned to sit on a split spacer shoulder 58 of the outer ring 22 between the first and second solid polymer electrolyte membranes 38, 46. The split spacer 56 includes a top split half 60 and a bottom split half 62 and defines a product gas discharge channel 64 between the two half 60, 62.

As best seen in FIGS. 3–6, a supply fluid such as water moves into the spherical section cell 16M through a supply fluid inlet 66 passing through the outer ring, and into a supply fluid entry channel 68, as represented by a schematic arrow in the inlet 66 and entry channel 68 in FIG. 3. The supply fluid entry channel 68 is in fluid communication between the inlet 66 and the first and second support screens 32, 34 on opposed sides of the support dome 24. The support ring 54 is broken into a first C-shaped segment 70 and a second C-shaped segment 72 so that a support ring inlet 74 (best seen in FIG. 5) is defined between the first and second segments 70, 72. The support ring inlet 74 is positioned adjacent the supply fluid entry channel 68 where the entry channel defines a supply fluid entry bore 76 in the support shoulder 52 of the outer ring 22 (best seen in FIG.3). The supply fluid entry channel 68 may be a drilled throughbore passing through the supply fluid inlet 66 in the outer ring 22, wherein the throughbore is capped with a plug 77 to limit fluid movement along the inlet 66 and entry channel 68.

The supply fluid then passes along and through the first and second support screens 32, 34 and through the first and second porous metal plates 30, 36 to contact one of the solid polymer electrolyte membranes, for example the first solid polymer electrolyte membrane 38, as shown in FIG. 3, wherein the supply fluid reacts electrochemically with the membrane. If the supply fluid is water, the water is electrolyzed at the membrane, so that a product gas such as oxygen passes out of the membrane 38 adjacent the first expanded metal plate 40 into the product gas chamber 47. The product gas then moves through the product gas discharge vent 64 defined by the split spacer 56 and into a product gas outlet 78 (seen in FIGS. 3 and 6) within the outer ring, as represented by the schematic directional arrow within the outlet in FIG. 3. The supply fluid remaining in the supply fluid side 26 side of the cell 16M then contains entrained hydrogen gas and water, and assists in cooling the cell 16M in a well-known manner as it travels out of the cell through a supply fluid discharge channel 80 and a supply fluid outlet 82 within the outer ring 22. The supply fluid discharge channel 80 and outlet 82 are shown only in FIG. 6, but are constructed as virtual mirror images of the supply fluid inlet 66 and entry channel 68 shown in FIG. 3.

Figure 6:
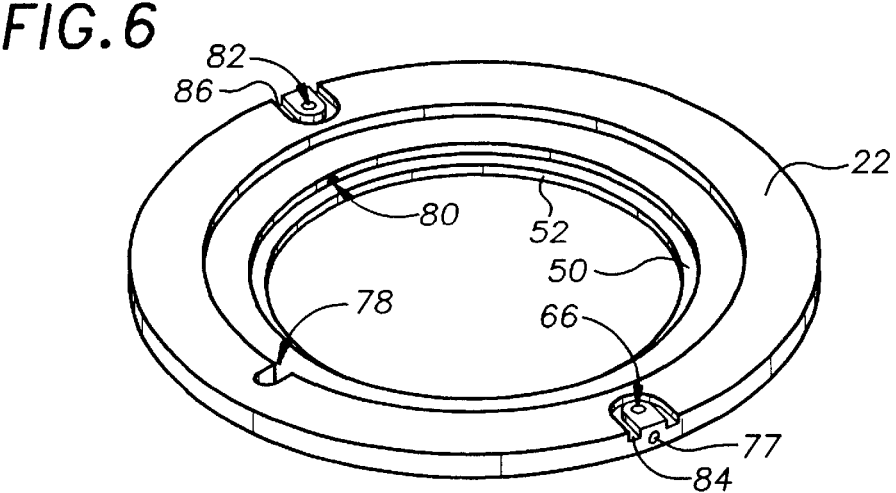
FIG. 6 is a perspective view of an outer ring of the spherical section electrochemical cell stack.

Each spherical section electrochemical cell 16A–16N includes a by-pass pressure means for directing a product gas to pass out of the cell stack 10 to ambient and thereby by-pass any supply fluid or any combination of supply fluid and product gas, such as a first by-pass pressure channel 84 and a second by-pass pressure channel 86. As best seen in FIGS. 3 and 6, the first by-pass pressure channel 84 defines a semi-circular channel surrounding the supply fluid inlet in the outer ring 22, and the second by-pass pressure channel 86 forms a semi-circular channel surrounding the supply fluid outlet 82. The first and second by-pass pressure channels 84, 86 are sealed by the second solid polymer electrolyte membrane 46 (as shown in FIG. 3) and the membrane 46 serves as a gasket between adjacent spherical section electrochemical cells to seal fluids in a well-known manner. In the event the second membrane 46 fails under high operating pressures and allows product gas to pass out of the product gas outlet 78 and along the outer ring 22, the product gas would then pass into the first or second by-pass pressure channels 84, 86 and discharge to ambient outside of the spherical section electrochemical cell stack 10. If the product gas is oxygen and the supply fluid includes entrained hydrogen gas as described above, discharging the oxygen gas to ambient through the first or second by-pass pressure channels 84, 86 protects against mixing of the oxygen and hydrogen gas, which mixing could upon ignition result in a catastrophic explosion, as is well known. The spherical section electrochemical cells 16A–16N include electrical conductivity means for passing a current through the cells. As best seen in FIG. 7, the outer ring 22 of spherical section cell 16N is separated from a second outer ring 88 of adjacent spherical section cell 16M by the second solid polymer electrolyte membrane 46. In a manner well-known in electrochemical cell art, the electrical conductivity means includes the outer ring 22 of cell 16N which serves as a cathode, while a first metal plate extension 92 and second metal plate extension 94 of the first and second expanded metal plates 40, 44 of the product gas side 28 of cell 16N serve as an anode. The second outer ring 88 adjacent a second supply fluid side 90 of cell 16M serves as a cathode for cell 16M and is electrically insulated from the product gas side 28 of cell 16N by the second solid polymer electrolyte membrane 46. (It is noted that for convenience the components of the second supply fluid side 90 shown in FIG. 7 are identical to the components of the supply side of cell 16N shown in FIG. 3, and are therefore not described herein in detail.) The membrane 46 defines a conductivity opening 96 that permits the second metal plate extension 94 to contact the second outer ring 88 and thereby permits flow of an electrical current between the anode of cell 16N and the cathode of adjacent cell 16M. The first and second metal plate extensions 92, 94 are separated by a metallic spring 98 that assures low electrical resistance between the anode of cell 16N and the cathode of adjacent cell 16M, and the first and second metal plate extensions 92, 94 pass through a metal plate extension bore 100 defined within the top and bottom split halves 60, 62 of the split spacer 56 (best seen in FIG. 4). By this arrangement, the cathodes and anodes of each of the spherical section cells 16A–16N direct an electrical current from a direct current voltage source and lead 101 electrically connected to the outer ring 22 of cell 16N, through adjacent cells 16M–16A, and out of the stack 10 through a current exit lead 103 in the spherical section end plate 12 to electrolyze the supply fluid into a product gas or gasses in a well-known manner.

As shown in FIG. 2, the spherical section electrochemical cell stack 10 includes integral control cavity means defined within the spherical section pressure header 18 for controlling flow of supply fluids and product gases into and out of the stack 10, wherein cavities of the integral control cavity means are dimensioned to contain operating pressures of a product gas, such as approximately 2,000 P.S.I. The integral control cavity means may include a product gas valve cavity 102 integral with the pressure header 18, wherein the product gas outlet 78 of cell 16N (and of the adjacent cells 16A–16M stacked on cell 16N) are aligned above product gas valve cavity 102 so that the product gas leaving the cells 16A–16N passes into the cavity 102. The cavity 102 houses a product gas control valve 104 sealed within the cavity by first, second and third valve seals 106, 108, 110, such as standard "O-ring" seals, and the valve 104 includes a valve casing 112 that supports a first sealing ball 114 within a valve passage 115 by a first valve spring 116 to seal flow of the product gas through the valve passage. A product gas solenoid 118 is secured to a valve stem 120 of the product gas control valve so that when activated the solenoid overcomes a second valve spring 122 to remove the first sealing ball 114 and a second sealing ball 124 and thereby allow the product gas to flow out of the product gas valve cavity 102 and into a pressure header throughbore 126, through a pressure chamber fitting 128, a pressure chamber pipe 130, and into a pressure chamber product gas distributor 132 where the product gas passes into the high pressure chamber 20 to be exposed to a standard product gas dryer and filter compound 134 such as a silica gel to filter and dry the product gas. A first manual override switch 136 is secured to the product gas solenoid 118 to manually open and close the valve in the event of failure of the solenoid or valve components. A supply fluid solenoid 138 with a second manual override switch 140 is secured to the pressure header 18 within a supply fluid valve cavity 142 (as shown schematically in FIG. 2) to control a supply fluid control valve (not shown) in a well-known manner similar to the product gas control valve 104.

The integral control cavity means also includes a filtered product gas valve cavity 144 for housing a filtered product gas valve 146 which is secured to the pressure header 18 by a threaded fastener 148 and sealed within the header 18 by a fourth valve seal 150. The filtered product gas valve 146 includes a filtered gas valve body 147, a third sealing ball 152 seated adjacent a filtered product gas throughbore 154 within the pressure header 18, a second valve stem 156 supporting the ball 152, a double ring seal stem seal 158 between the stem and header 18, and threaded stem section 160 dimensioned to be adjustably secured to the pressure header so that rotational movement of a filtered product gas switch 162 moves the third sealing ball 152 to permit the filtered product gas to flow into a discharge throughbore 164 within the filtered product gas valve body 147 and into a discharge line coupler 165 and product gas discharge line 166, out of the cell stack 10. The coupler 165 includes a threaded extension 168 to secure the coupler 165 to the valve body 147.

As best seen in FIGS. 2 and 1, the spherical section electrochemical cells 16A–16N and spherical section bottom plate 14 are secured between the spherical section top end plate 12 and pressure header by a plurality of standard bolt, nut and washer structures 170A, 170B, 170C, 170D, 170E, 170F, 170G, 170H, 170I, 170J, 170K, 170L that pass through corresponding throughbores (not shown) in bolt extensions 172A, 172B, 172C, 172D, 172E, 172F, 172G, 172H, 172I, 172J, 172K, 172L in the spherical section top and bottom plates 12, 14 and pressure header 18, as seen best in FIG. 1.

As best seen in FIG. 3, because the support dome 24 is a spherical section the inherently uneven pressure forces acting upon it from spring plate 42 are directed to the outer ring 22. Consequently, only the outer ring 22 of cell 16N and of the other cells 16A–16M needs to have mechanical strength characteristics capable of carrying a greatest difference in the spring forces required to preload the cells 16A–16N for adequate electrical contact between cell components. Therefore the electrochemical cell stack 10 of the present invention achieves substantial weight, and cost savings as a result of the spherical section form of the support dome 24 in each cell 16A–16N compared to prior art electrochemical cells having flat support surfaces. Further weight and hence cost savings are achieved by the high pressure chamber 20 having about one half of its enclosure being defined by the spherical section base plate 14. Finally, additional weight and cost savings are achieved by having the integral control cavity means defined within the pressure header 18 so that the high operating pressures of approximately 2,000 P.S.I. of the product gas may be contained within the integral product gas valve cavity 102, integral supply fluid control valve cavity 142, and filtered product gas valve cavity 144 of the pressure header 18. Materials used in making the described components of the spherical section electrochemical cell stack 10, unless described above with specificity, are standard materials well-known in the art.

While the present invention has been described and illustrated with respect to a particular construction of a spherical section electrochemical cell stack, it will be understood by those skilled in the art that the present invention is not to be limited to this particular example. For example, while the description above describes electrolysis of a supply fluid into at least one separated product gas, the invention could also be utilized in a "fuel cell" embodiment. Further, the invention may include one, or a plurality of spherical section electrochemical cells such as the cell 16N described above in detail. Accordingly, reference should be made to the attached claims rather than the foregoing description to determine the scope of the invention.

Having thus described the invention, what is claimed is:

1. A spherical section electrochemical cell stack, comprising:

a. a spherical section top end plate and a spherical section bottom end plate;

b. a spherical section electrochemical cell secured between the top and bottom end plates so that curvature dimensions of the top and bottom end plates and of the spherical section electrochemical cell are in parallel alignment;

c. electrical conductivity means for passing a current through the cell; and d. a spherical section pressure header secured to the spherical section bottom end plate so that curvature dimensions of the bottom end plate and spherical section pressure header are in opposed alignment to thereby define a high pressure chamber between the bottom end plate and pressure header.

2. The spherical section electrochemical cell stack of claim 1, wherein the stack includes a plurality of spherical section electrochemical cells.

3. The spherical section electrochemical cell stack of claim 1, wherein the electrochemical cell includes an outer ring surrounding a spherical section mechanical support means for supporting electrochemical components of the cell and for directing forces acting on the cell to the outer ring.

4. The spherical section electrochemical cell stack of claim 3, wherein the spherical section mechanical support means comprises a metallic support dome.

5. The spherical section electrochemical cell stack of claim 1, wherein the high pressure chamber is filled with a product gas dryer and filter so that a product gas produced by the electrochemical cell is directed to pass through the high pressure chamber to be dried and filtered before the product gas leaves the cell stack.

6. The spherical section electrochemical cell stack of claim 1, wherein the spherical section electrochemical cell includes electrochemical component means for processing a supply fluid into a product gas, the electrochemical component means comprising an outer ring surrounding a supply fluid side and a product gas side, the supply fluid side including sequentially stacked a first porous metal plate, a first support screen adjacent the first porous metal plate, a metallic support dome adjacent the first support screen, a second support screen adjacent the metallic support dome, a second porous metal plate adjacent the second support screen, and a first solid polymer electrolyte membrane adjacent the second porous metal plate, and the product gas side including sequentially stacked a first expanded metal plate adjacent the first solid polymer electrolyte membrane, a spring plate adjacent the first expanded metal plate, a second expanded metal plate adjacent the spring plate, and a second solid polymer electrolyte membrane adjacent the second expanded metal plate.

7. The spherical section electrochemical cell stack of claim 6, wherein the electrochemical cell includes a by-pass pressure means for directing a product gas to by-pass any supply fluid and pass out of the cell stack to ambient whenever a gasket adjacent the outer ring fails and permits the product gas to move along a surface of the outer ring.

8. A spherical section electrochemical cell stack for generating a product gas from a supply fluid, comprising:
   a. a spherical section top end plate and a spherical section bottom end plate;
   b. a spherical section electrochemical cell secured between the top and bottom end plates so that curvature dimensions of the top and bottom end plates and of the spherical section electrochemical cell are in parallel alignment;
   c. electrical conductivity means for passing a current through the cell; and
   d. a by-pass pressure means defined in an outer ring of the spherical section electrochemical cell for directing the product gas to by-pass any supply fluid and pass out of the cell stack to ambient whenever a gasket adjacent the outer ring of the spherical section electrochemical cell fails and permits the product gas to move along a surface of the outer ring.

9. The spherical section electrochemical cell stack of claim 8, wherein the by-pass pressure means comprises a semi-circular first by-pass pressure channel defined in a surface of the outer ring of the spherical section electrochemical cell, the first by-pass pressure channel surrounding a supply fluid inlet passing through the outer ring perpendicular to the surface of the outer ring so that any product gas moving along the surface of the outer ring flows into the first by-pass pressure channel away from the supply fluid inlet and through the channel out of the stack to ambient.

10. The spherical section electrochemical cell stack of claim 8, wherein the by-pass pressure means further comprises a semi-circular second by-pass channel defined in a surface of the outer ring of the spherical section electrochemical cell, the second by-pass pressure channel surrounding a supply fluid outlet passing through the outer ring perpendicular to the surface of the outer ring so that any product gas moving along the surface of the outer ring flows into the second by-pass pressure channel away from the supply fluid outlet and through the channel out of the stack to ambient.

11. The spherical section electrochemical cell stack of claim 8, wherein the electrochemical cell includes an outer ring surrounding a metallic support dome for supporting electrochemical components of the cell and for directing forces acting on the cell to the outer ring.

12. The spherical section electrochemical cell stack of claim 11, wherein the spherical section electrochemical cell includes electrochemical component means for processing the supply fluid into the product gas, the electrochemical component means comprising the outer ring surrounding a supply fluid side and a product gas side, the supply fluid side including sequentially stacked a first porous metal plate, a first support screen adjacent the first porous metal plate, a metallic support dome adjacent the first support screen, a second support screen adjacent the metallic support dome, a second porous metal plate adjacent the second support screen, and a first solid polymer electrolyte membrane adjacent the second porous metal plate, and the product gas side including sequentially stacked a first expanded metal plate adjacent the first solid polymer electrolyte membrane, a spring plate adjacent the first expanded metal plate, a second expanded metal plate adjacent the spring plate, and a second solid polymer electrolyte membrane adjacent the second expanded metal plate.

13. A spherical section electrochemical cell stack, comprising:
   a. a spherical section top end plate and a spherical section bottom end plate;
   b. a spherical section electrochemical cell secured between the top and bottom end plates so that curvature dimensions of the top and bottom end plates and of the spherical section electrochemical cell are in parallel alignment;
   c. electrical conductivity means for sassing a current through the cell:
   d. a spherical section pressure header secured to the spherical section bottom end plate so that curvature dimensions of the bottom end plate and spherical section pressure header are in opposed alignment to thereby define a high pressure chamber between the bottom end plate and pressure header; and,
   e. an integral control cavity means defined within the spherical section pressure header for controlling flow of a supply fluid and a product gas into and out of the stack, cavities of the integral control cavity means being dimensioned to contain operating pressures of the supply fluid and product gas during operation of the cell stack.

14. The spherical section electrochemical cell stack of claim 13, wherein the integral control cavity means includes a product gas valve cavity integral with the spherical section pressure header and in fluid communication with a product gas outlet so that the product gas valve cavity houses a product gas control valve.

15. The spherical section electrochemical cell stack of claim 13, wherein the integral control cavity means includes a filtered product gas valve cavity integral with the spherical section pressure header and in fluid communication with the high pressure chamber so that the filtered product gas valve cavity houses a filtered product gas control valve.

16. The spherical section electrochemical cell stack of claim 13, wherein the electrochemical cell includes an outer ring surrounding a metallic support dome for supporting electrochemical components of the cell and for directing forces acting on the cell to the outer ring.

17. The spherical section electrochemical cell stack of claim 16, wherein the electrochemical cell includes a bypass pressure means for directing a product gas to by-pass any supply fluid and pass out of the cell stack to ambient whenever a gasket adjacent the outer ring fails and permits the product gas to move along a surface of the outer ring.

18. The spherical section electrochemical cell stack of claim 17, wherein the by-pass pressure means comprises a semi-circular first by-pass pressure channel defined in a surface of the outer ring of the spherical section electrochemical cell, the first by-pass pressure channel surrounding a supply fluid inlet passing through the outer ring perpendicular to the surface of the outer ring so that any product gas moving along the surface of the outer ring flows into the first by-pass pressure channel away from the supply fluid inlet and through the channel out of the stack to ambient.

19. The spherical section electrochemical cell stack of claim 18, wherein the by-pass pressure means further comprises a semi-circular second by-pass channel defined in a surface of the outer ring of the spherical section electrochemical cell, the second by-pass pressure channel surrounding a supply fluid outlet passing through the outer ring perpendicular to the surface of the outer ring so that any product gas moving along the surface of the outer ring flows into the second by-pass pressure channel away from the supply fluid outlet and through the channel out of the stack to ambient.

20. The spherical section electrochemical cell stack of claim 19, wherein the spherical section electrochemical cell includes electrochemical component means for processing the supply fluid into the product gas, the electrochemical component means comprising the outer ring surrounding a supply fluid side and a product gas side, the supply fluid side including sequentially stacked a first porous metal plate, a first support screen adjacent the first porous metal plate, a metallic support dome adjacent the first support screen, a second support screen adjacent the metallic support dome, a second porous metal plate adjacent the second support screen, and a first solid polymer electrolyte membrane adjacent the second porous metal plate, and the product gas side including sequentially stacked a first expanded metal plate adjacent the first solid polymer electrolyte membrane, a spring plate adjacent the first expanded metal plate, a second expanded metal plate adjacent the spring plate, and a second solid polymer electrolyte membrane adjacent the second expanded metal plate.

\* \* \* \* \*